Figure 1:
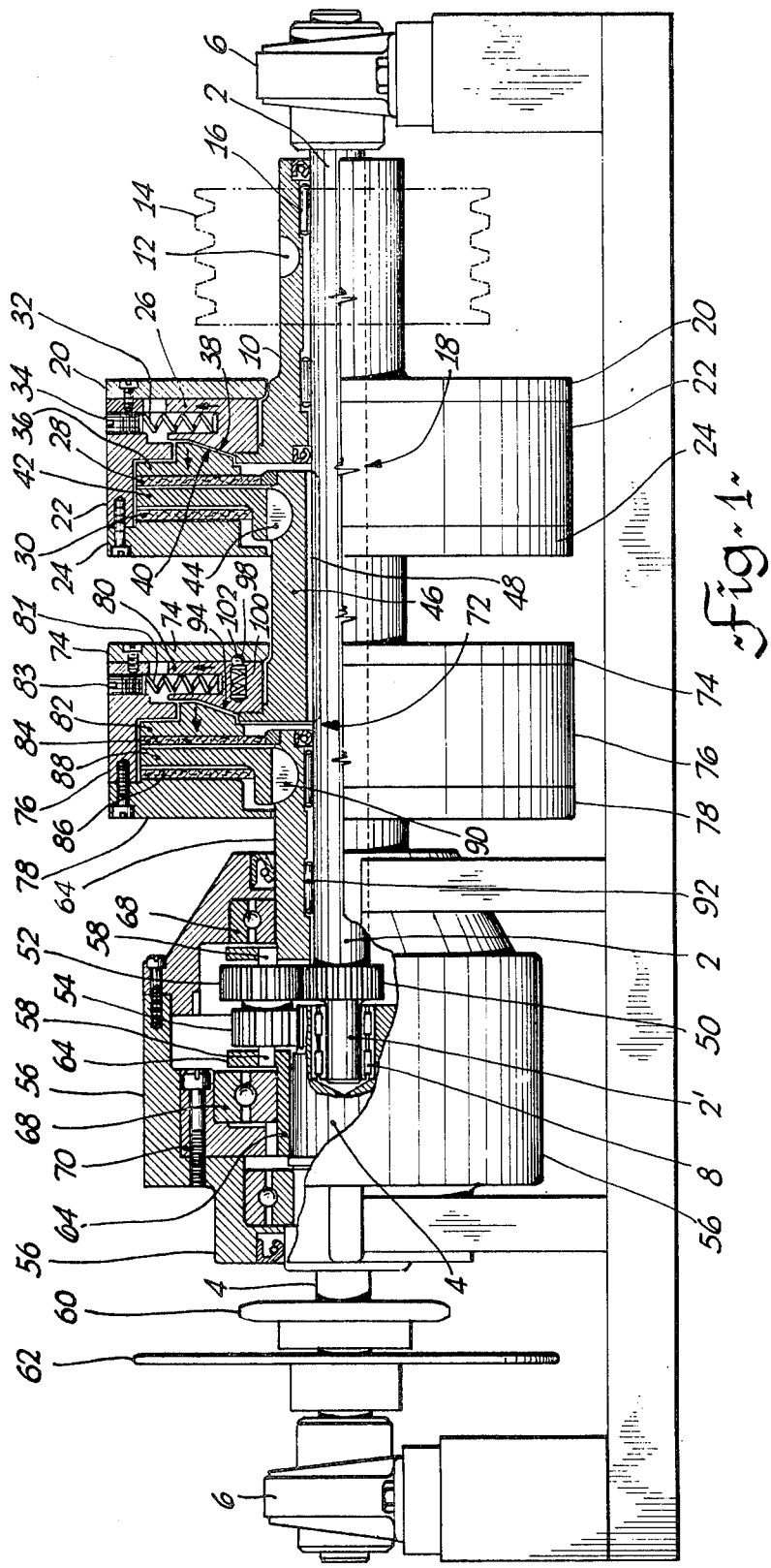

United States Patent [19]

Boutin

[11] 3,962,934

[45] June 15, 1976

[54] AUTOMATIC VARIABLE SPEED TRANSMISSION

[76] Inventor: Laurent Boutin, St. Evariste, Quebec, Canada

[22] Filed: May 31, 1974

[21] Appl. No.: 475,114

[52] U.S. Cl. .............................. 74/752 E; 192/48.8; 192/105 B
[51] Int. Cl.² ........................................... F16H 3/74
[58] Field of Search .................. 74/752 E, 789, 336, 74/336.5; 192/105 B

[56] References Cited
UNITED STATES PATENTS

| | | | |
|---|---|---|---|
| 1,797,826 | 3/1931 | Gage | 74/336 X |
| 2,182,427 | 12/1939 | Dunn | 74/752 E |
| 2,210,668 | 8/1940 | Hopkins | 74/752 E X |
| 2,597,854 | 5/1952 | Cross et al. | 74/789 X |
| 2,939,343 | 6/1960 | Berklege | 74/752 E |
| 3,109,326 | 11/1963 | Holtan | 74/752 E X |
| 3,171,524 | 3/1965 | Croft et al. | 192/105 B |
| 3,768,337 | 10/1973 | Racicot | 74/752 E |

*Primary Examiner*—Benjamin W. Wyche
*Assistant Examiner*—Frank H. McKenzie, Jr.
*Attorney, Agent, or Firm*—Rupert J. Brady

[57] ABSTRACT

An automatic variable speed transmission, particularly for use in recreational vehicles, is disclosed. The transmission consists of a driving shaft and a driven shaft and a first centrifugal clutch hub rotatably carried by the driving shaft, and means are provided to rotate the first centrifugal clutch hub. A first centrifugal clutch assembly is secured to the first centrifugal clutch hub and is rotatable therewith, and a second centrifugal clutch hub is secured to the driving shaft and rotatable therewith and a first friction plate secured to the second centrifugal clutch hub is adapted to be engaged and driven by the first centrifugal clutch assembly upon the first centrifugal clutch assembly attaining a pre-selected speed of rotation. A driving shaft pinion is secured to the driving shaft and engages a first pinion of a first and second pinion group with rotatably carried by a gear casing and integral gear casing hub which is secured to the driven shaft. The first and second pinion are secured together and the second pinion is in driving engagement with the driven shaft. A second centrifugal clutch assembly is carried by the second centrifugal clutch hub and is rotatable therewith, and a second friction plate is secured to the gear casing hub which is rotatably carried by the driving shaft. The second centrifugal clutch engages and drives the gear casing hub through the second friction plate upon the attaining of a pre-selected speed of rotation to achieve a 1:1 driving shaft to driven shaft speed ratio.

6 Claims, 1 Drawing Figure

U.S. Patent   June 15, 1976   3,962,934

AUTOMATIC VARIABLE SPEED TRANSMISSION

The present invention relates to a transmission, and particularly to an air-cooled automatic variable speed transmission assembly.

While the invention has particular application for use as a transmission for motor vehicles, particularly snow and all terrain vehicles, it will be appreciated that the invention is not so limited and that it has applicability wherein an automatic transmission of comparatively low cost with minimum maintenance is required.

The transmission of drive power from a motor to a driven axle, particularly on recreational vehicles has always been a weak link in the drive system and additionally has always been a source of danger for the operator of the vehicle. In known vehicles, it is usual that power is transmitted from the motor to a drive axle through adjustable sheaves and these sheaves have caused several injuries and in some instances the loss of a body member and in some cases failure of the sheave assembly has been fatal.

As indicated, it is believed that all vehicles now in use employ a single variable speed belt that breaks frequently due to the great forces imparted to the belt by the adjustable sheave especially at slower speeds. The replacement of the belt is costly, and moreover, it necessitates from the operator some mechanical ability that many users of such recreational vehicles are completely lacking. In all cases, replacement of a broken belt is a source of inconvenience.

Experimentation is presently being conducted in the use of fluid drive type transmissions for recreational vehicles such as snow mobiles and all terrain vehicles but to date, these experiments have had little or no success.

In order to keep the size of a transmission compatible with small recreational vehicles and also to keep the initial investment in proportion with the cost of the complete vehicle, all efforts are now being made to eliminate as many auxiliary components from the transmission as is possible. Efforts in this direction, however, have not been satisfactory, with the major problem being encountered when working with fluid drive transmissions is a dissipation of the heat developed due to the working liquid. Of course, other associated problems are the provision of a sufficient quantity of transmission fluid, size of oil reservoir, low initial starting torque, etc.

It is the main object of the present invention to provide a transmission and particularly an automatic transmission for use in smaller type recreational vehicles which is completely mechanical in operation, hence avoiding the inherent problems and disadvantages of a fluid drive transmission and to provide a mechanical variable speed transmission which is safe and durable in operation overcoming the problems encountered in the presently used sheave drive assemblies.

It is a further object of the present invention to provide an automatic transmission particularly for use in association with smaller type recreational vehicles and which provides a lower speed higher torque primary drive speed and which, after a certain speed, is attained, will automatically shift to a 1:1 drive ratio in respect of the motor speed to driven axle speed and this 1:1 speed ratio is believed preferable for recreational vehicles as providing reasonable speed and power requirements.

In general, the inventive concept resides in the provision of a driving shaft and a driven shaft rotatably and coaxially mounted end to end with the driving shaft carrying a first centrifugal clutch hub to which is secured a sheave assembly or pulley assembly for reception of the V-belt drive or chain drive from suitable motor means. The first centrifugal clutch hub is rotatably mounted on the driving shaft and carries portions of a first centrifugal clutch assembly which, after a certain speed has been attained, is operable to couple with a second cylindrical clutch hub which is secured to the driving shaft and rotates therewith. The driving shaft is provided with a driving shaft pinion which meshes with a first pinion of a first and second pinion group with the second pinion of the group meshing in driving engagement with the driven shaft. Thus, in the lower speed higher torque range the driven shaft is driven in a speed ratio less than 1:1 in respect of the speed of rotation of the driven shaft to the driving shaft. After a further pre-selected speed is attained, a second centrifugal clutch assembly carried by the second centrifugal clutch hub is operable to couple with a gear casing hub which is rotatably carried by the driving shaft, with the gear casing hub being integral with a gear casing which is secured to the driven shaft. Accordingly, as the second centrifugal clutch assembly is actuated, a coupling of the driving shaft to the driven shaft is attained, resulting in a 1:1 drive ratio between the driving shaft and the driven shaft.

These and other objects of the present invention will become apparent from the following description in conjunction with the accompanying FIG. 1 in which the present apparatus is shown in side longitudinal view partially in section for a better understanding.

Referring to the attached drawing, the assembly consists of a driving shaft 2 and a driven shaft 4 which are supported for rotation by means of bearing pillow blocks 6 or in any other suitable manner. In a preferred construction and as shown in the drawings the inner end of the driving shaft 2 is provided with a reduced diameter portion 2' which is received within an aperture (not numbered) provided in the inner end of the driven shaft 4 and supported therein by bearing means such as needle bearings 8. This particular arrangement enables rotation of either of the shafts 2 or 4 freely of the other shaft and yet provides additional support to the assembly with any friction between the shafts being substantially negligible in view of needle bearings 8.

The driving shaft 2 carries a first or primary centrifugal clutch hub 10 to which is fixedly secured (by means for example of key 12) a sheave assembly 14 which through V-belt drive receives rotational force from a motor not shown in the drawings. The hub 10 is mounted on the driving shaft 2 by means of a bearing assembly such as needle bearings 16 which enable rotation of the hub 10 on the driving shaft 2 at lower speeds. The hub 10 also carries portions of a primary or first centrifugal clutch assembly indicated generally by numeral 18 in the drawings. The components of the primary clutch assembly carried by the hub 10 are clutch housing members 20, 22 and 24 which carry a sliding weight 26, liners 28 and 30, a reactor spring 32 and a tensioning screw 34 and a pressure plate 36. Rotation of the hub 10 causes equal rotation of the various components carried thereby.

At a slow speed of rotation of the hub 10 (such as an idle speed) the hub 10 simply rotates on the driving shaft 2, but as the speed of rotation of hub 10 increases centrifugal force acting upon sliding weight 26 moves the weight radially outwardly from the axis of the hub and against the action of reactor spring 32 and this outward movement of the weight 26 causes its bevelled cam face 38 to contact complementary beveled cam surface 40 of the pressure plate 36 to move the pressure plate longitudinally on the axis of the hub 10 (to the left in FIG. 1) to cause the liner 28 to move toward liner 30 and tighten upon friction plate 42 which as a result will receive a rotational force corresponding to the rotational force of hub 10. The friction plate 42 is keyed (as at 44) to a second or secondary centrifugal clutch hub (46) which in turn is keyed to driving shaft 2 by means of a suitable keying assembly 48, and it will be appreciated that a speed of rotation is imparted to the driving shaft 2 which corresponds to and is equal to the rotational speed of the hub 10 and sheave assembly 14.

While not specifically shown in the drawings the primary centrifugal clutch assembly 18 preferably carries six sliding weights 26 spaced radially around the axis of the hub 10 at 60° intervals, but it will be appreciated that more or less sliding weights can be utilized as desired.

The inner end of the driving shaft 2 carries a pinion 50 secured thereto and the pinion 50 is in meshing engagement with a first pinion 52 which is solid with a second pinion 54, with the pinions 52 and 54 being rotatably carried by gear carrier 64 by means of an axle 58. The gear 64 is rotatably housed within stationary torque amplifier housing 56. The first and second pinions 52 and 54 may be machined from one solid piece to provide what may be called a pinion group, or alternatively the two pinions may be machined separately and thereafter secured together in fixed relationship. Although only one pinion group is shown in the drawing is is preferred that three pinion groups are carried by the housing radially therearound at spaced distances of 120° for more uniform torque transmission, and less wear.

As pinion 50 rotates, rotation is imparted to first pinion 52 and a similar rotation imparted to second pinion 54 which is in meshing engagement with driven shaft 4 as shown in FIG. 1. The ratio of rotational speed of the driving shaft 2 to the driven shaft 4 may of course be controlled by a selection of the pinion gear ratios of the pinions 50, 52 and 54, and while any desired ratio can be chosen in order to provide power to the driven shaft, the ratio of the speed of rotation of the driving shaft to the speed of rotation of the driven shaft should preferably be greater than 1:1 providing the driven shaft 4 with slower speed but higher torque.

As will be noted in the drawings, the driven shaft 4 is provided with a suitable sprocket 60 for engagement with a chain drive (not shown) and the shaft 4 may also be provided with a plate 62 of a disc brake assembly to assist in stopping of the rotating shaft as desired.

The direction of rotation of the pinions 52 and 54 will tend to rotate the gear carrier 64 which is rotatably carried within housing 56 by bearing means such as 68, but such counter reaction is prevented by backstop or one-way clutch 70 which is fast with housing 56.

A secondary or second centrifugal clutch assembly generally indicated at numeral 72 in the drawings is selectably operable at a higher speed of rotation than the primary centrifugal clutch 18. The secondary centrifugal clutch assembly consists of housing members 74, 76 and 78, reactor spring 81 and tensioning screw 83, along with sliding weight 80 and pressure plate 82 and liners 84 and 86. The liners 84 and 86 are provided on opposite sides of a friction plate 88 which is keyed by means of key 90 to the gear carrier 64 which is rotatably mounted on driving shaft 2 by suitable means such as needle bearings 92. As the speed of rotation of hub 46 increases to a preselected degree sliding weight 80 moves radially outwardly and its beveled cam surface 94 acts upon and moves pressure plate 82 to the left as shown in FIG. 1 causing the liner 84 to contact and bear against friction plate 88 and move the friction plate 88 against liner 86. As a result of this centrifugal clutch action the speed of rotation of hub 46 is imparted to gear carrier 64 and relative rotational speed of gear carrier 64 approaches rotational speed of hub 46 as clutch 72 reaches full engagement. With the secondary centrifugal clutch 72 engaged the rotational speed of the driven shaft 4 will be equal (1:1) with the rotational speed of the driving shaft 2, and the sheave assembly 14. A 1:1 drive is satisfactorily suitable for high speed operations of recreation vehicles.

The secondary centrifugal clutch assembly 72 is provided with a locating ball 98 carried within the sliding weight 80 and normally forced outwardly therefrom by means of a locating ball spring 100. The housing 74 of the secondary centrifugal clutch assembly is provided with a circular groove or recess 102 as shown in the drawings to receive a portion of the ball 98. When the speed of rotation of the sliding weight 80 increases, centrifugal force effects more and more radially outward pressure on the sliding weight but outer movement is initially prevented by the locating ball 98. The action of the locating ball reaction spring 100 is not affected by this centrifugal force as it has a tangential path and the spring 100 therefore exerts a continuous and equal pressure to prevent ball 98 from being drawn out of the recess 102. In short, the arrangement of the ball 98 retards normal outward movement of the sliding weight 80. As the secondary clutch 72 picks up speed however, centrifugal force on the sliding weight 80 increases and finally overcomes the retarding action of ball 98 and causes ball 98 to withdraw from the recess 102 and when this happens, ball 98 no longer interferes with the normal operation of the sliding weight 80 and centrifugal clutch assembly. The purpose of providing the ball 98 is to prevent extended friction time between the liners 84 and 86 and the surfaces of friction plate 88, with the result that no overheating in the clutch 72 takes place and no overdue wear of the liners and friction plate occurs. When speed of rotation of the hub 46 again decreases as with slowing of motor speed the sliding weight 80 returns to its normal position under the influence of reaction spring 81 and this again will prevent extended sliding contact between friction plate and liners.

The ball 98 arrangement is preferably employed only in the second centrifugal clutch assembly 72 and is operative only when the driving shaft 2 and driven shaft 4 are already rotating. The release of the retarding influence of the ball results in a quicker coupling of the second clutch to the gear case hub with minimum wear on the friction plate 88 and liners 84 and 86, and as the driven shaft is already rotating (the vehicle moving) the quicker clutch coupling is barely noticeable to passengers.

If the ball arrangement were used in association with the first centrifugal clutch assembly 18, the quicker and more abrupt coupling could be annoying to passengers and in any event the start would not be as smooth.

As in the case of the primary clutch the secondary clutch is preferably provided with six sliding weights, reaction springs, pressure plates, etc. equally and radially spaced therearound, although a lesser or greater number of these components could be used as desired.

With respect to both first and second clutch assemblies 18 and 72, the sliding weights 26 and 80 are controlled in their radial outward movement by means of reactor springs 32 and 81 and their respective tensioning screws 34 and 83, respectively. These springs are preferably made of spring steel of known construction and the diameter of the winding and the number of windings per inch permits accurate measurement of the reaction forces under any linear compression. The fine thread tensioning screws 34 and 83 will permit very fine and accurate increments of spring pressure against the centrifugal force of the sliding weights. A preferred and practical means of adjustment of these springs is to use a torque wrench graduated in inch-pounds to tighten the screws to the desired capacity. From this, it is obvious that one can vary either of the first or second clutches to obtain the desired performance from the use of the transmission assembly. For example if the screw 34 of the first clutch 18 is tightened more than for normal operation, a higher speed of rotation of the hub 10 will be necessary to engage the first clutch. With this setting, the power imparted to the transmission will have a more positive and faster acceleration although the acceleration will be less gentle. By loosening the screw 34 one may adjust the transmission to commence rotation at a slower motor speed and together with this setting by tightening the adjusting screw 84 of the second clutch 72 sufficiently one can reach full motor speed even without engaging the second clutch or attaining high speed and this of course renders a vehicle such as snow mobile safe for passengers and drivers of a young age.

I claim:

1. An automatic variable speed air-cooled transmission assembly comprising a driving shaft and a driven shaft coaxially mounted end to end with an end of the driving shaft being rotatably received within the end of thd driven shaft, and a first centrifugal clutch hub in the form of a sleeve rotatably carried by the driving shaft, and means to rotate the first centrifugal clutch hub, and a first centrifugal clutch assembly integrally secured to the first centrifugal clutch hub and rotatable therewith, the first centrifugal clutch assembly comprising a housing and a number of sliding weights held in inner positions by adjustable reaction springs, each sliding weight having a beveled cam surface for wedging contact with a complementary beveled can surface on a movable pressure plate, and a second centrifugal clutch hub in the form of a sleeve secured by a key to the driving shaft and rotatable therewith, and a first friction plate secured to the second centrifugal clutch hub extending into the first centrifugal clutch assembly and adjacent the movable pressure plate, the first friction plate being engaged and driven by the movable pressure plate of the first centrifugal clutch assembly upon the first centrifugal clutch assembly attaining a preselected speed of rotation to thereby effect rotation of the second centrifugal clutch hub and the driving shaft, and a driving shaft pinion adjacent the said end of the driving shaft, the driving shaft pinion engaging first pinions of three first and second pinion groups which are equidistantly spaced around and rotatably mounted in a gear carrier, the first and second pinions of each group being secured together and the second pinions all being in driving engagement with the driven shaft, and a second centrifugal clutch assembly integrally secured to the second centrifugal clutch hub and rotatable therewith, the second centrifugal clutch assembly comprising a housing and a number of sliding weights held in inner positions by adjustable reaction springs, each sliding weight having a beveled cam surface for wedging contact with a complementary beveled cam surface on a movable pressure plate, and a second friction plate integrally secured to the gear carrier, and extending into the second centrifugal clutch assembly and adjacent the movable pressure plate, the second friction plate being engaged and driven by the movable pressure plate of the second centrifugal clutch assembly upon the second centrifugal clutch assembly attaining a second faster preselected speed of rotation to thereby effect rotation of the gear carrier to achieve a 1:1 driving shaft to driven shaft speed ratio, each sliding weight in the second centrifugal clutch assembly having a bore parallel with the axis of the driving shaft and a ball carried in the bore and a ball reaction spring nested in the bore acting upon the ball to normally maintain the ball in an outer position and in a circular groove provided in the housing, movement of the ball out of the circular groove as a result of said second faster preselected speed of rotation effecting snap coupling of the movable pressure plate against the second friction plate, and means preventing rotation of the gear carrier before driving engagement of the second centrifugal clutch assembly and permitting rotation of the gear carrier with the driving shaft after engagement.

2. A transmission assembly according to claim 1, including a tension screw in association with each reaction spring to regulate the tension in the springs.

3. An assembly according to claim 1, wherein the means for rotating the first clutch hub includes a sheave assembly adapted to receive drive from a motor.

4. An assembly according to claim 1, the driven shaft includng a chain drive sprocket and disc brake portion.

5. An assembly according to claim 2, the ratio of the speed of rotation of the driven shaft to the driving shaft being less than 1:1 before operation of the second centrifugal clutch assembly.

6. An assembly according to claim 1, in which said means preventing and permitting rotation of the gear casing comprises a backstop or a one-way clutch.

* * * * *